(12) United States Patent
Suthersan

(10) Patent No.: US 6,322,700 B1
(45) Date of Patent: *Nov. 27, 2001

(54) ENGINEERED IN SITU ANAEROBIC REACTIVE ZONES

(75) Inventor: Suthan S. Suthersan, Yardley, PA (US)

(73) Assignee: Arcadis Geraghty & Miller, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,790

(22) Filed: Aug. 2, 2000

Related U.S. Application Data

(63) Continuation of application No. 09/157,819, filed on Sep. 21, 1998, now Pat. No. 6,143,177, which is a continuation-in-part of application No. 08/951,219, filed on Sep. 15, 1997, now abandoned, which is a continuation of application No. 08/661,621, filed on Jun. 11, 1996, now abandoned, which is a division of application No. 08/420,234, filed on Apr. 11, 1995, now Pat. No. 5,554,290.

(51) Int. Cl.$^7$ .................................................. C02F 3/00

(52) U.S. Cl. ...................... 210/610; 210/614; 210/747; 210/912; 210/913; 210/717; 435/262.5

(58) Field of Search .................................... 210/603, 610, 210/611, 747, 605, 903, 908, 912, 913, 614, 717; 435/262.5

(56) References Cited

U.S. PATENT DOCUMENTS

| | | | |
|---|---|---|---|
| Re. 33,102 | 10/1989 | Visser et al. ..................... | 166/267 |
| 825,745 | 7/1906 | Mitchell . | |
| 1,286,666 | 12/1918 | Layne . | |
| 1,877,915 | 9/1932 | Lewis . | |
| 2,104,327 | 1/1938 | Kotzebue ............................. | 166/21 |
| 2,180,400 | 11/1939 | Coberly ................................ | 103/46 |
| 2,523,091 | 9/1950 | Bruce ..................................... | 166/2 |
| 2,635,696 | 4/1953 | Asketh .................................... | 166/1 |
| 2,765,850 | 10/1956 | Allen ..................................... | 166/39 |

(List continued on next page.)

FOREIGN PATENT DOCUMENTS

3427532 C1   8/1985 (DE) .

OTHER PUBLICATIONS

In Situ Reactive Walls, Remediation Engineering, Chapter 7, pp. 187–206.*
In Situ Aeration of Groundwater: A Technology Overview —Oct. 16, & 17, 1990.
Proceedings of the NWWA/API Conference on Petroleum Hydrocarbons and Organic Chemicals in Ground Water—Prevention, Detection and Restoration—Nov. 13–15, 1985.

(List continued on next page.)

*Primary Examiner*—Christopher Upton
(74) *Attorney, Agent, or Firm*—Standley & Gilcrest LLP

(57) ABSTRACT

An in situ method and system for reductive dechlorination, the precipitation of chromium, the precipitation of heavy metals, and microbial denitrification. The invention comprises the formation of in situ anaerobic reactive zones to precipitate and filter out dissolved heavy metals as metallic sulfides, to degrade nitrate to nitrogen gas, to reduce chlorinated hydrocarbons to ethene, and to precipitate and filter out chromium. The invention is comprised of an injection well or wells that extend into a contaminated groundwater. A conduit located within the injection well conveys carbohydrates and sulfates to the contaminated groundwater. Microbes digest the carbohydrates to produce sulfate reducing and methanogenic conditions within the reactive zone that include a dissolved oxygen level less than about 0.5 mg/l, a redox potential less than about –250 mv, and a dissolved organic carbon to contaminant ratio of greater than about 50:1. These biogeochemical conditions lead to the reduction of PCE to TCE to DCE to VC and eventually to ethene. These biogeochemical conditions also lead to the precipitation of heavy metals, the precipitation of chromium, and microbial denitrification.

16 Claims, 2 Drawing Sheets

U.S. PATENT DOCUMENTS

| | | | |
|---|---|---|---|
| 2,875,831 | 3/1959 | Martin et al. ................... | 166/9 |
| 2,969,226 | 1/1961 | Huntington ..................... | 262/3 |
| 3,216,905 | 11/1965 | Baptist ............................ | 195/2 |
| 3,277,962 | 10/1966 | Flickinger et al. ............. | 166/15 |
| 3,351,132 | 11/1967 | Dougan et al. ................. | 166/11 |
| 3,547,190 | 12/1970 | Wilkerson ....................... | 166/75 |
| 3,649,533 | 3/1972 | Reijonen et al. ................ | 210/50 |
| 3,653,438 | 4/1972 | Wagner ............................ | 166/266 |
| 3,665,716 | 5/1972 | Rogers et al. ................... | 61/35 |
| 3,705,851 | 12/1972 | Brauer ............................. | 210/1 |
| 3,727,686 | 4/1973 | Prates et al. .................... | 166/261 |
| 3,735,815 | 5/1973 | Myers ............................. | 166/313 |
| 3,765,483 | 10/1973 | Vencil ............................. | 166/265 |
| 3,796,883 | 3/1974 | Smith et al. .................... | 250/260 |
| 3,823,777 | 7/1974 | Allen et al. ..................... | 166/266 |
| 3,828,525 | 8/1974 | Copa et al. ..................... | 55/68 |
| 3,846,290 * | 11/1974 | Raymond ......................... | 210/610 |
| 3,980,138 | 9/1976 | Knopik ............................ | 166/314 |
| 3,990,513 | 11/1976 | Perch .............................. | 166/267 |
| 4,016,930 | 4/1977 | Arnold ............................ | 166/266 |
| 4,026,355 | 5/1977 | Johnson et al. ................. | 166/246 |
| 4,126,556 | 11/1978 | Swanson et al. ................ | 210/242 |
| 4,167,973 | 9/1979 | Forte et al. ..................... | 166/267 |
| 4,183,407 | 1/1980 | Knopik ............................ | 166/314 |
| 4,241,787 | 12/1980 | Price ............................... | 166/105 |
| 4,283,212 | 8/1981 | Graham et al. ................. | 62/18 |
| 4,296,810 | 10/1981 | Price ............................... | 166/265 |
| 4,303,127 | 12/1981 | Freel et al. ...................... | 166/266 |
| 4,306,961 | 12/1981 | Taciuk ............................ | 208/11 R |
| 4,323,122 | 4/1982 | Knopik ............................ | 166/267 |
| 4,366,846 | 1/1983 | Curati, Jr. ....................... | 141/1 |
| 4,369,839 | 1/1983 | Freeman et al. ................ | 166/53 |
| 4,401,569 * | 8/1983 | Jhaveri et al. .................. | 210/610 |
| 4,435,292 | 3/1984 | Kirk et al. ....................... | 210/747 |
| 4,442,901 | 4/1984 | Zison .............................. | 166/369 |
| 4,469,176 | 9/1984 | Zison et al. ..................... | 166/250 |
| 4,510,243 * | 4/1985 | Haya et al. ...................... | 210/614 |
| 4,518,399 | 5/1985 | Croskell et al. ................. | 55/16 |
| 4,544,381 | 10/1985 | Schmidt .......................... | 55/89 |
| 4,574,062 | 3/1986 | Weitman ......................... | 261/147 |
| 4,576,717 * | 3/1986 | Collin et al. .................... | 210/610 |
| 4,588,506 | 5/1986 | Raymond et al. .............. | 210/606 |
| 4,593,760 | 6/1986 | Visser et al. .................... | 166/267 |
| 4,625,801 | 12/1986 | McLaughlin et al. .......... | 166/267 |
| 4,660,639 | 4/1987 | Visser et al. .................... | 166/267 |
| 4,662,900 | 5/1987 | Ottengraf ........................ | 55/90 |
| 4,664,805 * | 5/1987 | Focht .............................. | 210/611 |
| 4,683,064 * | 7/1987 | Hillberg et al. ................. | 210/747 |
| 4,713,343 * | 12/1987 | Wilson, Jr. et al. ............ | 210/611 |
| 4,715,965 | 12/1987 | Sigerson et al. ................ | 210/800 |
| 4,723,968 | 2/1988 | Schippert et al. .............. | 55/80 |
| 4,730,672 | 3/1988 | Payne .............................. | 166/266 |
| 4,738,206 | 4/1988 | Noland ............................ | 110/346 |
| 4,745,850 | 5/1988 | Bastian et al. .................. | 98/56 |
| 4,749,491 * | 6/1988 | Lawes et al. ................... | 210/610 |
| 4,755,304 * | 7/1988 | Hallberg et al. ................ | 210/747 |
| 4,765,902 | 8/1988 | Ely et al. ........................ | 210/610 |
| 4,780,215 | 10/1988 | Carlson .......................... | 210/722 |
| 4,782,625 | 11/1988 | Gerken et al. .................. | 47/1.42 |
| 4,799,878 | 1/1989 | Schaeffer ........................ | 431/202 |
| 4,806,148 | 2/1989 | Ottengraf ........................ | 55/223 |
| 4,832,122 | 5/1989 | Corey et al. .................... | 166/266 |
| 4,832,711 | 5/1989 | Christel, Jr. et al. ........... | 55/20 |
| 4,842,448 | 6/1989 | Koerner et al. ................. | 405/258 |
| 4,846,134 | 7/1989 | Perry et al. ..................... | 123/520 |
| 4,846,852 | 7/1989 | Schweitzer et al. ............ | 55/31 |
| 4,848,460 | 7/1989 | Johnson, Jr. et al. .......... | 166/245 |
| 4,850,745 | 7/1989 | Hater et al. ..................... | 405/258 |
| 4,864,942 | 9/1989 | Fochtman et al. .............. | 110/226 |
| 4,872,994 | 10/1989 | Jakob ............................. | 210/691 |
| 4,886,119 | 12/1989 | Bernhardt et al. .............. | 166/267 |
| 4,890,673 | 1/1990 | Payne .............................. | 166/266 |
| 4,892,688 | 1/1990 | Bernhardt ....................... | 261/24 |
| 4,895,085 | 1/1990 | Chips .............................. | 110/346 |
| 4,919,570 | 4/1990 | Payne .............................. | 405/128 |
| 4,943,305 | 7/1990 | Bernhardt ....................... | 55/170 |
| 4,945,988 | 8/1990 | Payne et al. .................... | 166/266 |
| 4,950,394 | 8/1990 | Bernhardt et al. .............. | 215/170 |
| 4,951,417 | 8/1990 | Gerken et al. .................. | 47/1.42 |
| 4,954,258 * | 9/1990 | Little ............................... | 210/610 |
| 4,966,611 | 10/1990 | Schumacher et al. .......... | 55/20 |
| 4,982,788 | 1/1991 | Donnelly ........................ | 166/266 |
| 5,006,250 * | 4/1991 | Roberts et al. ................. | 210/610 |
| 5,009,266 | 4/1991 | Dieter ............................. | 166/245 |
| 5,015,365 | 5/1991 | Vara et al. ...................... | 208/262.1 |
| 5,017,289 | 5/1991 | Ely et al. ........................ | 210/610 |
| 5,050,676 | 9/1991 | Hess et al. ..................... | 166/267 |
| 5,069,286 | 12/1991 | Roensch et al. ................ | 166/312 |
| 5,076,360 | 12/1991 | Morrow .......................... | 166/267 |
| 5,076,727 | 12/1991 | Johnson et al. ................ | 405/128 |
| 5,080,793 | 1/1992 | Urlings .......................... | 210/603 |
| 5,086,717 | 2/1992 | McCrossan ..................... | 110/346 |
| 5,095,975 | 3/1992 | Bernhardt ....................... | 166/67 |
| 5,111,883 | 5/1992 | Savery ............................ | 166/269 |
| 5,116,163 | 5/1992 | Bernhardt ....................... | 405/128 |
| 5,122,165 | 6/1992 | Wang et al. .................... | 55/38 |
| 5,122,166 | 6/1992 | Hyrcyk et al. .................. | 55/38 |
| 5,143,606 | 9/1992 | Bernhardt ....................... | 210/170 |
| 5,143,607 | 9/1992 | Bernhardt ....................... | 210/170 |
| 5,147,535 | 9/1992 | Bernhardt ....................... | 210/138 |
| 5,161,914 | 11/1992 | Rahn et al. ..................... | 405/128 |
| 5,171,103 | 12/1992 | Bernhardt ....................... | 405/128 |
| 5,172,764 | 12/1992 | Hajali et al. .................... | 166/267 |
| 5,173,092 | 12/1992 | Rudder ............................ | 55/53 |
| 5,180,503 | 1/1993 | Gorelick et al. ................ | 210/758 |
| 5,183,563 | 2/1993 | Rodden .......................... | 210/180 |
| 5,185,080 * | 2/1993 | Boyle .............................. | 210/903 |
| 5,197,541 | 3/1993 | Hess et al. ..................... | 166/67 |
| 5,220,958 | 6/1993 | Bernhardt ....................... | 166/67 |
| 5,221,159 | 6/1993 | Billings et al. ................. | 405/128 |
| 5,263,795 | 11/1993 | Corey et al. .................... | 405/128 |
| 5,277,815 | 1/1994 | Beeman ......................... | 210/605 |
| 5,279,740 * | 1/1994 | Basile et al. .................... | 210/747 |
| 5,281,333 | 1/1994 | Bernhardt ....................... | 210/170 |
| 5,302,286 * | 4/1994 | Simprini et al. ................ | 210/610 |
| 5,318,698 | 6/1994 | Bernhardt ....................... | 210/150 |
| 5,330,651 * | 7/1994 | Robertson et al. ............. | 210/747 |
| 5,358,357 | 10/1994 | Mancini et al. ................ | 405/128 |
| 5,382,267 | 1/1995 | Savage et al. .................. | 44/623 |
| 5,384,048 * | 1/1995 | Hazen et al. .................... | 210/747 |
| 5,389,267 | 2/1995 | Gorelick et al. ................ | 210/758 |
| 5,402,848 | 4/1995 | Kelly .............................. | 166/266 |
| 5,425,598 | 6/1995 | Pennington .................... | 405/118 |
| 5,439,594 | 8/1995 | Regan et al. ................... | 210/747 |
| 5,441,365 | 8/1995 | Duffney et al. ................. | 405/128 |
| 5,441,641 * | 8/1995 | Vail et al. ....................... | 210/747 |
| 5,456,550 * | 10/1995 | Devlin ............................ | 210/747 |
| 5,480,549 * | 1/1996 | Looney et al. .................. | 210/610 |
| 5,482,630 * | 1/1996 | Lee et al. ........................ | 210/614 |
| 5,545,801 | 8/1996 | Fulton ............................ | 588/249 |
| 5,545,803 | 8/1996 | Heath et al. .................... | 588/253 |
| 5,554,290 | 9/1996 | Suthersan ....................... | 210/610 |
| 5,575,589 | 11/1996 | Suthersan ....................... | 405/128 |
| 5,588,490 | 12/1996 | Suthersan et al. .............. | 166/370 |
| 5,698,092 | 12/1997 | Chen .............................. | 210/94 |
| 5,713,522 | 2/1998 | Lundberg ....................... | 239/265.39 |
| 5,753,122 * | 5/1998 | Taylor et al. ................... | 210/611 |
| 5,833,388 | 11/1998 | Edwards et al. ................ | 405/52 |
| 5,833,855 * | 11/1998 | Saunders ........................ | 210/611 |
| 5,893,975 | 4/1999 | Eifert ............................. | 210/602 |
| 6,007,274 | 12/1999 | Suthersan ....................... | 405/128 |

6,150,157 * 11/2000 Keasling et al. .................. 435/262.5

OTHER PUBLICATIONS

Fifth National Outdoor Action Conference on Aquifer Restoration, Ground Water Monitoring, and Geophysical Methods—May 13–16, 1991 (Ground Water Mgmt., Book 5 of the Series).

The Fifth National Symposium and Exposition on Aquifer Restoration and Ground Water Monitoring—May 21–24, 1985.

Haztech International '88—Hazardous Waste & Hazardous Materials Management—Sep. 20–22, 1988.

Volume II, Proceedings of Petroleum Hydrocarbons and Organic Chemicals in Ground Water: Prevention, Detection and Restoration—Nov. 9–11, 1988.

Public Notice (3 pages).

Declaration Statement—Record of Decision; Rod Decision Summary (with attachments); and Responsive Summary, Upjohn Manufacturing Company, Superfund Site, Barceloneta, Puerto Rico.

Lexis–Nexis—Environmental Protection Agency, Upjohn Manufacturing Company—Sep. 30, 1988.

Near Surface Geochemical Monitoring of Underground Gas Storage Facilities—Apr., 1986.

SPL External Vapor Vending (Elimination) Program—Nov. 2, 1983.

Water Well Technology—Field Principals of Exploration Drilling and Development of Ground Water and Other Selected Minerals (4 page cover and pp. 240–308) (Michael D. Campbell and Jay H. Lehr).

Ground Water and Wells—A Reference Book for the Water–Well Industry—4th Printing 1975, Chapter 10, pp. 185–208 and Chapter 20, pp. 375–394.

Hydrogeologic and Geochemical Investigation, Mt. Olive Greens, Mt. Olive Township, N.J.—Nov., 1982.

A Monitoring and Removal Program for Leaked Propane Gas in the Vadose (Unsaturated) Zone: A Case Study (Thomas Lobasso, Jr. and Andrew J. Barber).

* cited by examiner

ENGINEERED IN SITU ANAEROBIC REACTIVE ZONES

This is a continuation of U.S. application Ser. No. 09/157,819 filed Sep. 21, 1998, now U.S. Pat. No. 6,143, 177. U.S. application Ser. No. 09/157,819 is a continuation-in-part of U.S. application Ser. No. 08/951,219, filed Sep. 15, 1997 now abandoned. U.S. application Ser. No. 08/951, 219 is a continuation of U.S. application Ser. No. 08/661, 621, filed Jun. 11, 1996, now abandoned. U.S. application Ser. No. 08/661,621 was a divisional of U.S. application Ser. No. 08/420,234, filed Apr. 11, 1995, now U.S. Pat. No. 5,554,290.

BACKGROUND AND SUMMARY OF THE INVENTION

The present invention relates generally to a method and apparatus for removing contaminants dissolved in groundwater and, more particularly, to in situ anaerobic reactive zones for removing contaminants dissolved in groundwater.

Contamination of groundwater with potentially hazardous materials is a common problem facing industry, the government, and the general public. Frequently, as a result of spills, leakage from storage facilities, or surface discharges, contaminants percolate into groundwater, thereby posing a threat to drinking water supplies. While groundwater is not as susceptible to pollution as surface water, once polluted, its restoration is difficult and long term. Various methods for withdrawing and treating contaminated groundwater have met with limited success. Typically, groundwater is removed from the saturated zone, treated, and then returned to the saturated zone. These known methods involve great expense and incur risks inherent in treating heavy metals and other contaminants, such as nitrates, present in the sub-surface.

Preferred embodiments of the method and apparatus of the present invention utilize the principle of in situ anaerobic reactive zones for the precipitation of metals, microbial denitrification, reductive dechlorination, and/or the precipitation of chromium. Precipitation is a process of producing a separable solid phase within a liquid medium. The method may involve installing injection wells into the saturated zone of contaminated soil. A substantially impervious well casing may be placed in the borehole with a fluid-permeable section at its base.

In one preferred method of the present invention, a sufficient amount of carbohydrates and sulfates may be metered into the conduit under pressure to facilitate proper mixing and dispersion in the saturated zone to achieve desired sulfate reducing and methanogenic conditions. The present invention may utilize molasses extract to introduce both carbohydrates and sulfates instead of injecting carbohydrates and sulfates separately via two injection streams. A mixing pump at the base of the conduit may be utilized to provide a more homogeneous mixture within the conduit. The mixture may then permeate through the fluid-permeable screen of the conduit at its base and mix with the surrounding groundwater.

Heterotrophic, sulfate reducing, and denitrifying microorganisms indigenous to the soil microflora may then serve as catalysts for the precipitation of metals, microbial denitrification, reductive dechlorination, and the precipitation of chromium. Two reactions involving microbes may form part of some methods of the present invention. One reaction utilizes the carbohydrates and the dissolved oxygen in the groundwater to form carbon dioxide and water. The result of this reaction causes a depletion in the oxygen level and leads to the formation of substantially anaerobic conditions in the saturated zone. In particular, this reaction preferably reduces the level of dissolved oxygen in the zone being treated to less than about 0.5 mg/l. Furthermore, this reaction preferably creates biogeochemical conditions in the zone being treated that include a redox potential of less than about −250 mv and a dissolved organic carbon to contaminant ratio of greater than about 50:1.

Under the sulfate reducing and methanogenic conditions, the sulfates present may be reduced to form sulfide ions. The sulfide ions may then react with the dissolved heavy metals to form a solid precipitate which eventually is filtered out by the soil matrix. There is no need to remove the precipitate from the soil matrix because it is insoluble and harmless.

As an example, the following reactions are indicative of the process utilizing sugar with sulfate to precipitate dissolved lead, zinc, mercury, and nickel from groundwater:

$$C_6H_{12}O_6 + 6O_2 \rightarrow 6CO_2 + 6H_2O$$

$$3SO_4^{2-} + C_6H_{12}O_6 \rightarrow 6CO_2 + 6H_2O + 3S^{2-}$$

$$Pb^{2+} + S^{2-} \rightarrow PbS\downarrow$$

$$Zn^{2+} + S^{2-} \rightarrow ZnS\downarrow$$

$$Ni^{2+} + S^{2-} \rightarrow NiS\downarrow$$

$$Hg^{2+} + S^{--} \rightarrow HgS\downarrow$$

In addition to the precipitation of metals, the aforementioned sulfate reducing and methanogenic conditions caused by the injection of carbohydrates and sulfates lead to the reduction of chlorinated hydrocarbons. Chlorinated hydrocarbons include tetrachloroethylene (PCE), trichloroethylene (TCE), dichloroethylene (DCE), and vinyl chloride (VC). Each of these chlorinated hydrocarbons can contaminate the groundwater supply. For example, exposure to high levels of PCE and TCE may cause harm to the nervous system, the liver, the kidney, or even death, and VC may be a common and highly carcinogenic groundwater contaminant.

As shown below, the injection of carbohydrates and sulfates into the saturated zone leads to the reduction of PCE to TCE to DCE to VC and eventually to ethene, a harmless, inert gas. The ethene may eventually be stripped into the soil gas. As a result, a preferred method of the present invention removes dissolved PCE, TCE, DCE, and VC contamination from the groundwater.

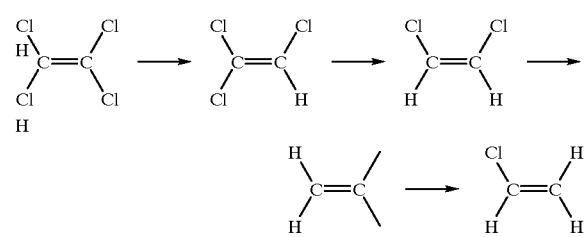

In addition, the injection of carbohydrates and sulfates to achieve the aforementioned biogeochemical conditions in the saturated zone leads to the precipitation of chromium, another harmful contaminant. In particular, the injection of carbohydrates and sulfates leads to the reduction of hexavalent chromium to trivalent chromium. Trivalent chromium is then precipitated as chromic hydroxide.

$$Cr^{6+} \rightarrow Cr^{3+}$$

$$Cr^{3+} + 3OH^- \rightarrow Cr(OH)_3$$

The use of molasses extract to achieve each of the above reactions is a unique application. The precipitation of metals and reductive dechlorination in an in situ reactive zone rather than in an above ground aqueous phase reactor is also a unique development. The hydrogeological manipulations used in this invention to cause a homogeneous in situ reactive zone in all three dimensions is also unique. Using the soil matrix itself to filter out the insoluble metal precipitates and the inert gas is also unique.

The in situ reactive zone concept can also be applied to microbially denitrify the dissolved nitrates ($NO_3^-$) to nitrogen gas. The technologies used today to decontaminate dissolved $NO_3^-$ in groundwater involve pumping the contaminated groundwater and using above ground technologies, such as ion exchange beds, reverse osmosis, or anaerobic bioreactors. In this invention, the injection of carbohydrates will create an anaerobic zone due to the depletion of the dissolved oxygen. The carbohydrates may be injected in the form of molasses. In the saturated zone, the denitrifying microbial consortia will degrade the $NO_3^-$ ion first to a nitrite ion ($NO_2^-$) and eventually nitrogen ($N_2$) gas. The nitrogen gas, thus formed, will be eventually stripped into the soil gas. As a result, the dissolved nitrate contamination may be removed from the groundwater.

$$C_6H_{12}O_6 + 6O_2 \rightarrow 6CO_2 + 6H_2O$$

$$NO_3^- \rightarrow NO_2^{31} \; N_2\uparrow$$

The present invention may be practiced utilizing single injection wells or in multiple clusters depending upon the depth of the saturated zone, the geology of the remediation site, and the degree of mixing that may be created by each individual injection well. It should be recognized that required microbial cultures may be added to the soil matrix. This may be required where the indigenous microbes are not present in sufficient numbers to initiate the reactions.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
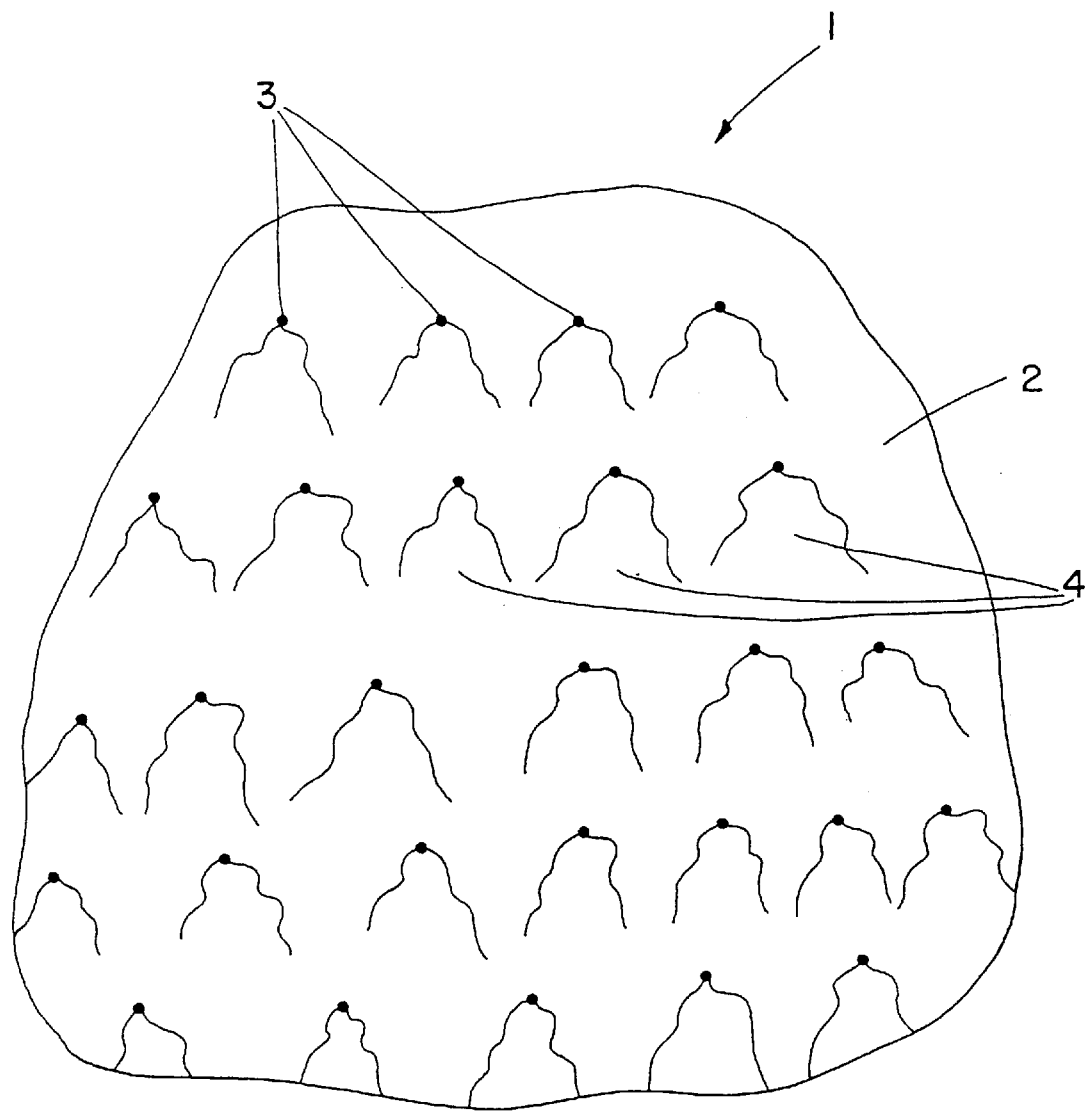
FIG. 1 is a plan view of a preferred embodiment of the present invention.

The present invention is directed to a method and apparatus for achieving the precipitation of metals, microbial denitrification, reductive dechlorination, and/or the precipitation of chromium. FIG. 1 shows a plan view of a preferred embodiment of the present invention in operation at 1 to remediate the contaminant plume 2 consisting of dissolved metals., chlorinated hydrocarbons, or dissolved nitrates. Injection wells 3 are installed to extend below the water table. In situ reactive zones 4 may be created by injecting molasses extract in the case of dissolved metals and chlorinated hydrocarbons and by injecting carbohydrates in the case of nitrates.

Figure 2:
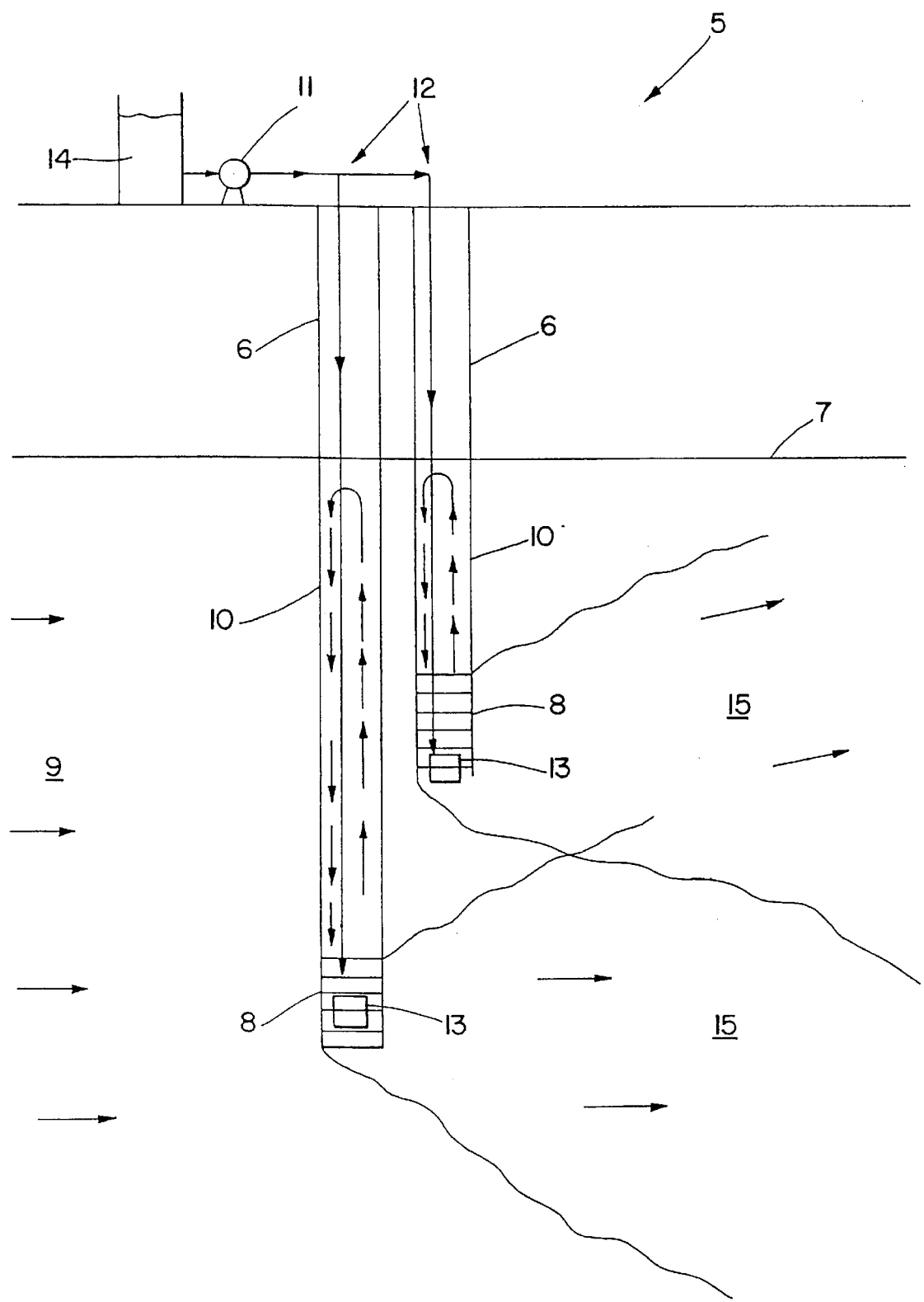
FIG. 2 is a cross sectional view of another embodiment of the present invention.

FIG. 2 shows a cross sectional view of another embodiment of the present invention in operation at 5 to remediate a dissolved contaminant plume. Injection wells 6 are installed to extend below the water table 7, and screens 8 or other similar permeable sections are installed in the contaminated zone 9. The wells include impermeable well sections 10 and the screens 8.

A metering pump 11 is operationally attached in communication with the injection wells 6 at 12. Optionally, mixing pump 13 may be placed within the wells 6 to facilitate mixing of the injected reagents. Reagent stock solution may be held in a holding tank 14.

Operation of the present invention may also be understood with reference to FIG. 2. Metering pump 11 may be operated to provide molasses extract (for metals precipitation and reductive dechlorination) and carbohydrates (for nitrate removal) below the water table 7 under pressure. This is to facilitate the reagents to be injected under pressure to form the in situ reactive zones 15 in a homogeneous manner in all three dimensions. If the reagents are fed by gravity alone into the injection wells 6, a two-dimensional reactive zone may only be formed around the top near the water table 7. Mixing pump 13 may be operated to mix the reagents as is shown by the counter-clockwise arrows within the conduit.

The indigenous microbes may then digest the carbohydrates utilizing the available dissolved oxygen within the reactive zones 15 to produce carbon dioxide and water, thereby forming anaerobic conditions within the reactive zones 15. The sulfates are then metabolized and converted to sulfide ($S^{2-}$) within these anaerobic reactive zones 15. These sulfide ions then combine with the dissolved heavy metal ($Me^{++}$) ions that contaminate the groundwater to form metallic sulfide precipitates out of the groundwater. The soil matrix within and down gradient of the reactive zone may then filter the precipitates and bind them with the soil matrix.

$$Me^{++} + S^{--} \rightarrow MeS\downarrow$$

The injection of molasses extract creates sulfate reducing and methanogenic conditions which preferably include a level of dissolved oxygen less than about 0.5 mg/l, a redox potential less than about −250 mv, and a dissolved organic carbon to contaminant ratio of greater than about 50:1. As a result, the injection of molasses leads to the reduction of PCE to TCE to DCE to VC and eventually to ethene, a harmless, inert gas. In addition, the injection of molasses extract leads to the reduction of hexavalent chromium to trivalent chromium which is then precipitated as chromic hydroxide.

In the case of $NO_3^-$ contaminated plumes, the indigenous microbes will digest the carbohydrates utilizing the available dissolved oxygen within the reactive zones 15 to form $CO_2$ and $H_2O$. Under these anaerobic conditions, the nitrates present in the reactive zones 15 will be converted to $NO_2^-$ (nitrite) and then to nitrogen gas by the indigenous denitrifying microbes.

$$NO_3^- \rightarrow NO_2^- \rightarrow N_2$$

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for removing contaminants dissolved in groundwater, said method comprising the steps of:
   supplying carbohydrates and sulfates to contaminated groundwater;
   wherein microorganisms in the contaminated groundwater metabolize said carbohydrates creating an anaerobic condition which leads to the precipitation of trivalent chromium as chromic hydroxide.

2. The method of claim 1 further comprising:
   providing at least one injection well extending from the ground surface to the contaminated groundwater; and
   placing a conduit within said at least one injection well, said conduit having a fluid-permeable section below the water table of the contaminated groundwater;
   wherein said carbohydrates and sulfates are forced out of said fluid-permeable section into the contaminated groundwater.

3. The method of claim 1 wherein said anaerobic condition comprises:
   a dissolved oxygen level less than about 0.5 mg/l;
   a redox potential less than about −250 mv; and
   a dissolved organic carbon to contaminant ratio of greater than about 50:1.

4. A method for removing contaminants dissolved in groundwater, said method comprising the steps of:
   supplying carbohydrates and sulfates to contaminated groundwater;
   wherein microorganisms in the contaminated groundwater metabolize said carbohydrates creating an anaerobic condition which leads to the precipitation of metal compounds.

5. The method of claim 4 further comprising:
   providing at least one injection well extending from the ground surface to the contaminated groundwater; and
   placing a conduit within said at least one injection well, said conduit having a fluid-permeable section below the water table of the contaminated groundwater;
   wherein said carbohydrates and sulfates are forced out of said fluid-permeable section into the contaminated groundwater.

6. The method of claim 4 wherein said anaerobic condition comprises:
   a dissolved oxygen level less than about 0.5 mg/l;
   a redox potential less than about −250 mv; and
   a dissolved organic carbon to contaminant ratio of greater than about 50:1.

7. A method for removing contaminants dissolved in groundwater, said method comprising the steps of:
   supplying carbohydrates and sulfates to contaminated groundwater;
   wherein microorganisms in the contaminated groundwater are catalysts for the creation of an anaerobic condition which leads to the precipitation of trivalent chromium as chromic hydroxide.

8. The method of claim 7 further comprising:
   providing at least one injection well extending from the ground surface to the contaminated groundwater; and
   placing a conduit within said at least one injection well, said conduit having a fluid-permeable section below the water table of the contaminated groundwater;
   wherein said carbohydrates and sulfates are forced out of said fluid-permeable section into the contaminated groundwater.

9. The method of claim 7 wherein said anaerobic condition comprises:
   a dissolved oxygen level less than about 0.5 mg/l;
   a redox potential less than about −250 mv; and
   a dissolved organic carbon to contaminant ratio of greater than about 50:1.

10. A method for removing contaminants dissolved in groundwater, said method comprising the steps of:
    supplying carbohydrates and sulfates to contaminated groundwater;
    wherein microorganisms in the contaminated groundwater are catalysts for the creation of an anaerobic condition which leads to the precipitation of metal compounds.

11. The method of claim 10 further comprising:
    providing at least one injection well extending from the ground surface to the contaminated groundwater; and
    placing a conduit within said at least one injection well, said conduit having a fluid-permeable section below the water table of the contaminated groundwater;
    wherein said carbohydrates and sulfates are forced out of said fluid-permeable section into the contaminated groundwater.

12. The method of claim 10 wherein said anaerobic condition comprises:
    a dissolved oxygen level less than about 0.5 mg/l;
    a redox potential less than about −250 mv; and
    a dissolved organic carbon to contaminant ratio of greater than about 50:1.

13. A method for removing contaminants dissolved in groundwater, said method comprising the steps of:
    supplying carbohydrates and sulfates to contaminated groundwater;
    wherein microorganisms in the contaminated groundwater are adapted to metabolize said carbohydrates and said sulfates to produce sulfide ions, thereby serving as catalysts for the precipitation of trivalent chromium as chromic hydroxide.

14. The method of claim 13 further comprising:
    providing at least one injection well extending from the ground surface to the contaminated groundwater; and
    placing a conduit within said at least one injection well, said conduit having a fluid-permeable section below the water table of the contaminated groundwater;
    wherein said carbohydrates and sulfates are forced out of said fluid-permeable section into the contaminated groundwater.

15. A method for removing contaminants dissolved in groundwater, said method comprising the steps of:
    supplying carbohydrates and sulfates to contaminated groundwater;
    wherein microorganisms in the contaminated groundwater are adapted to metabolize said carbohydrates and said sulfates to produce sulfide ions, thereby serving as catalysts for the precipitation of metal compounds.

16. The method of claim 15 further comprising:
    providing at least one injection well extending from the ground surface to the contaminated groundwater; and
    placing a conduit within said at least one injection well, said conduit having a fluid-permeable section below the water table of the contaminated groundwater;
    wherein said carbohydrates and sulfates are forced out of said fluid-permeable section into the contaminated groundwater.

* * * * *

UNITED STATES PATENT AND TRADEMARK OFFICE
CERTIFICATE OF CORRECTION

PATENT NO.   : 6,322,700 B1                                              Page 1 of 1
DATED        : November 27, 2001
INVENTOR(S)  : Suthan S. Suthersan It is certified that error appears in the above-identified patent and that said Letters Patent is hereby corrected as shown below:

Column 2,
Line 29, please delete "$Hg^{2+}+S^{--}\rightarrow HgS\downarrow$" and insert -- $Hg^{2+}+S^{2-}\rightarrow HgS\downarrow$ --
Lines 50-60, please delete

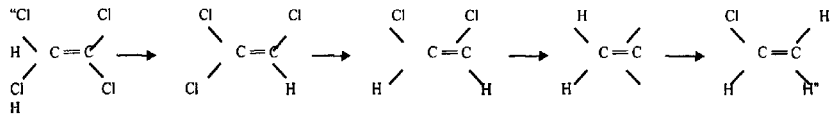

and insert --

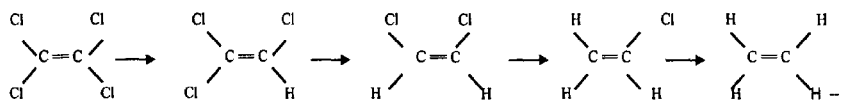

Column 3,
Line 30, please delete "$NO_3^-\rightarrow NO_2^{31}N_2\uparrow$" and insert -- $NO_3^-\rightarrow NO_2\rightarrow N_2\uparrow$ --

Signed and Sealed this

Twenty-first Day of January, 2003

JAMES E. ROGAN
*Director of the United States Patent and Trademark Office*